United States Patent [19]

Evankovich et al.

[11] 3,926,241
[45] Dec. 16, 1975

[54] FITTING STRUCTURE FOR TIRE RIM

[75] Inventors: Peter P. Evankovich, Butte; Robert J. Madden, Divide; Edward M. Peterson, Butte, all of Mont.

[73] Assignee: The Anaconda Company, New York, N.Y.

[22] Filed: Apr. 10, 1974

[21] Appl. No.: 459,592

[52] U.S. Cl. ................................ 152/415; 137/223
[51] Int. Cl.² ........................................ B60C 29/00
[58] Field of Search ........... 152/415, 427, 428, 429; 137/223 X, 230, 231, 234.5; 251/149; 141/38; 29/159.1

[56] References Cited
UNITED STATES PATENTS

| | | | |
|---|---|---|---|
| 2,621,700 | 12/1952 | Snyder | 137/223 X |
| 2,900,006 | 8/1959 | Lafaye | 29/159.1 X |
| 3,063,462 | 11/1962 | Potash | 137/223 |
| 3,610,312 | 10/1971 | Kilmarx | 152/427 |

*Primary Examiner*—Drayton E. Hoffman
*Assistant Examiner*—Larry H. Martin
*Attorney, Agent, or Firm*—Pennie & Edmonds

[57] ABSTRACT

An improved fitting or spud for use in coupling a source of pressure to a tire interior is disclosed. The spud may be mounted in and removed from the base of the rim for replacement without resort to disassembly of the tire from the rim. The base is bored and tapped to receive the spud in threaded fashion. Sealing means to prevent leakage of air past the spud may be employed. The spud has particular utility in association with rims for mounting tires of vehicles of the off-the-road type.

2 Claims, 3 Drawing Figures

U.S. Patent  Dec. 16, 1975  3,926,241
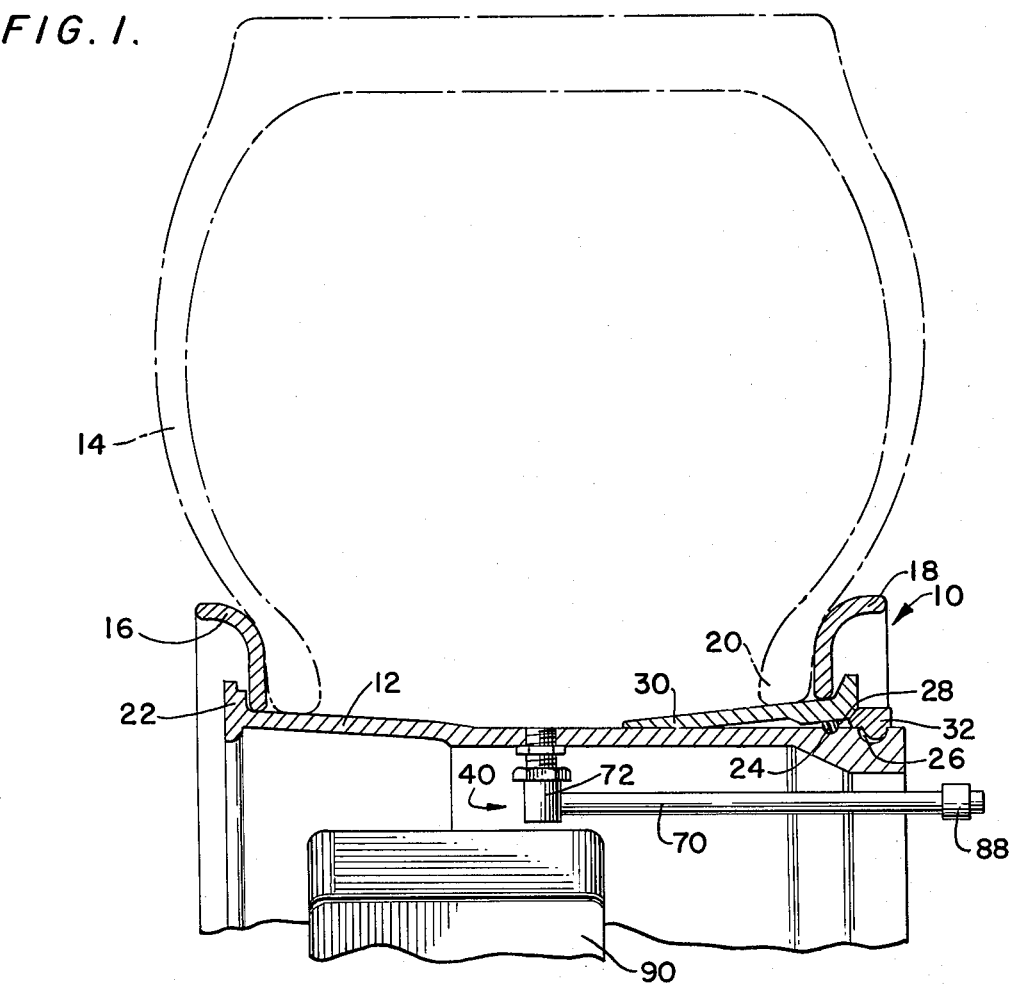
FIG. 1.
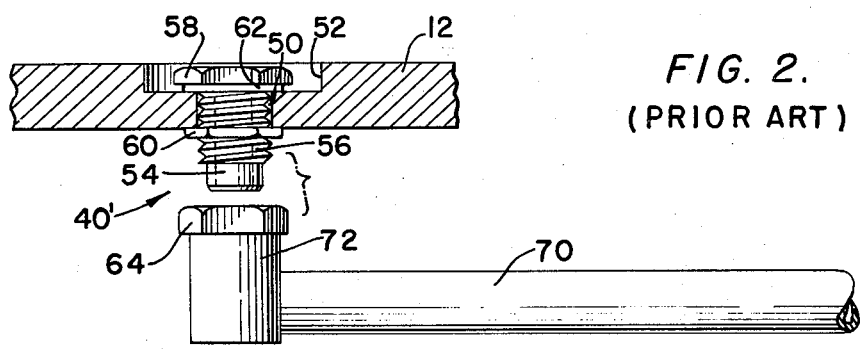
FIG. 2.
(PRIOR ART)
FIG. 3.
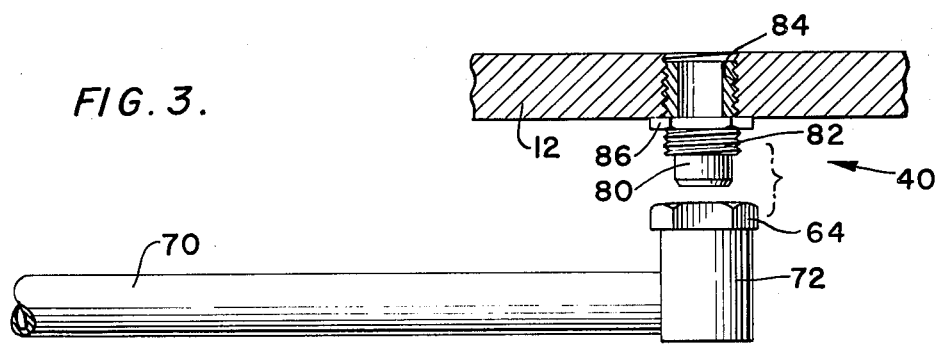

FITTING STRUCTURE FOR TIRE RIM

The present invention relates to an improved fitting carried by the rim of a tire for connecting a source of pressure to the tire interior. The fitting or so-called "spud", particularly, is adapted to be mounted on and replaced in the rim by threading the same into a tapped bore.

BACKGROUND OF THE INVENTION

A fitting or spud of the type contemplated herein for connecting a source of pressure to the interior of a tire is known in the prior art. Situations arise oftentimes which result in the requirement to replace the spud. To this end, the spud may leak because of latent fault or may be otherwise damaged through use of or repair to the vehicle. Spuds may be used on vehicles of the off-the-road type, such as large capacity haulage trucks, earthmovers, or other similar land vehicles which utilize tires of significantly greater size than the normal automobile tire. As an example, the contemplated tire size may be on the order of about 11.5 feet in diameter and having a tread width of about 40 inches. It should be apparent that tires of this size are very expensive. Care should be taken to maintain the tire in good condition to obviate unnecessary replacement.

Damage to tires of this type may be caused as an incident to the disassembly and reassembly of the tire on its supporting rim structure. Thus, it is desirable, once the initial assembly has been carried out, to maintain the tire on the rim as long as possible.

However, the spuds of the known prior art could only be replaced after removal of the tire from its supporting rim. To this end, the spud was formed by an elongated, circular member having an enlarged head at one end and including a through bore. The spud was provided with an exterior machine thread along a length sufficient to receive a locknut. The spud was passed through a bore in the rim from the tire side and secured by the locknut when tightened down on the spud thread. A grommet was received between the head and the rim for sealing the bore.

The rim structure to support a tire of the size heretofore mentioned is large, also. The structure is made up of several component parts including a cylindrical base, annular side flanges, a wedge or bead seat band, and a lockring as will be dicussed. These component parts have to be broken down and reassembled to carry out the maintenance described above. The operation is time consuming. Not only does this type of repair give rise to unnecessary loss in man hours but there is also the significant factor of down time of the vehicle to be considered. It is not uncommon that as much as six hours elapse during maintenance before the rim could be remounted on the vehicle.

BRIEF DESCRIPTION OF THE INVENTION

The present invention overcomes this problem and in accordance with an important aspect of this invention provides a spud which may be mounted in the rim of a tire from the outside without resort to disassembly of the tire from its supporting rim. The spud is received in a tapped bore formed in the rim base through cooperation of external threads on the spud. The spud is formed by a cylindrical member having an elongated through bore. The cooperating thread may be formed throughout a length of the cylindrical member both to permit full advance into the tapped rim bore and to accommodate a locknut which is received and tightened on the cylindrical member to prevent the same from working into or out of the tapped bore. A thread compound may be employed for sealing purposes. The spud provides a connecting mount for a hose and swivel connection to communicate fluid pressure to the interior of the tire.

In a further aspect of the present invention the cylindrical member may be formed with a pipe thread throughout a length substantially equal to the depth of the tapped hole as well as a machine thread over a length to accommodate the locknut and mounting of the swivel connection.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE DRAWING

The drawing forms a part and is illustrative of the present invention. By this drawing:

FIG. 1 is a fragmentary view partially in cross-section of a tire rim and improved fitting mounted therein;

FIG. 2 is an enlarged view of a prior art fitting; and,

FIG. 3 is an enlarged view of the improved fitting.

DESCRIPTION OF THE PREFERRED EMBODIMENT

The spud of the present invention has particular utility in connection with tire rims, for example, a tire rim capable of mounting an extra large tire suitable for use on off-the-road equipment, such as earth movers, or large capacity haulage trucks, to name a few.

FIG. 1 illustrates a portion of a typical tire rim 10 including a base portion 12 in the form of a cylindrical structure for closing the inner opening of a tire 14. The rim, additionally, includes a pair of annular flanges 16, 18 which are outwardly concave to conform generally to the surface of the tire compressed thereagainst in the region of the bead 20 by internal tire pressure.

The tire is mounted on the rim 10 in conventional manner. To this end, the flange 16 is received around the cylindrical base and moved into engagement with a projection 22 formed at the inner extreme of the base. The flange is restrained in this position since the diameter of the projection is in excess of that of the inner diameter of the flange 16. One wall of tire 14 is mounted on the rim so that the outer surface within the region of the bead is abutted against the convex side of the flange 16. The other wall of the tire, thereafter, is mounted on the rim so that both walls are confined between the flanges for the purpose of inflation.

The outer portion of the base 12 is enlarged within a gutter section provided with a pair of annular grooves 24, 26. The groove 24 supports an O-ring 28. The assembly of the tire 14 on rim 10 is completed by forcing a bead seat band 30 between the O-ring and both the inner diameter of flange 18 and the bead of the tire. The band is preferably wedge shaped to permit ease in movement to a seated position. The surfaces may be disposed at an angle of about 5°, one to the other. The outer portion of the band includes a lip 31 which acts in a manner similar to projection 22. To this end, the lip extends outwardly a distance in excess of the inner diameter of flange 18. A lockring 32 having an annular projection for cooperation with groove 26 in the gutter and a shoulder for cooperation with an outer surface of the band 30 secures the assembly. The band may provide a knurled upper surface to maintain the tire adjacent to the flange 18 prior to inflation.

A spud 40 is supported by the base 12 of rim 10 for providing fluid communication with the interior of the tire 14.

A prior art form of fitting may be seen in FIG. 2. In the prior art, the fitting 40' is received on the base 12 of rim 10 by manipulation of the shank portion 54 of the spud through the bore 50 from the tire side of the rim. An enlarged counterbore 52 accommodates the head portion 58 of the spud and a grommet 62 for sealing the bore. The spud includes a through bore and is externally threaded substantially throughout a length from the head to accommodate a locknut 60 which is tightened down on the spud to compress the grommet between the head and rim surface. The rim surface perferably is flat to aid in maintaining a good seal.

The spud 40' provides a structure for mounting the hose 70 supported by a swivel connection 72. The hose may be of a length as is necessary to communicate air from a source to a tire or the inner tire of a pair of tires. Upon receipt on the spud the hose is oriented to pass toward the outside of the tire (to the right as illustrated in FIG. 1) and the swivel is secured in proper disposition by any convenient means. To this end, securement may be carried out by tightening nut 64 onto the extending thread 56 of the shank 54 of the spud.

As should now be appreciated, the prior art spud 40' requires for replacement that the tire 14 be removed from the rim 10. In this manner the shank may be manipulated through the bore from the rim outside.

The spud of the present invention is an improvement over the prior art spud of FIG. 2. FIG. 3 is best illustrative of the improved spud. As shown, the spud 40 is formed by a cylindrical member 80 which is threaded along its outer surface over a portion of its length as illustrated at 82. The thread may include both pipe and machine threading. To this end the spud is received in a drilled and tapped bore 84 in the base 12 of rim 10 by intercooperation of the pipe threads. The improved spud is threaded into the base from the outside without the need for removal of the tire 14 during the replacement process. A seal to prevent leakage of air past the spud is provided by use of pipe thread compound. A locknut 86 may be received on the machine thread portion of the shank to position the spud in the tapped bore.

The hose 70 is mounted to the spud in a fashion as discussed in connection with FIG. 2. Thus, the nut 64 of swivel 72 is threadedly secured to the shank of the member 80 by cooperation with the machine thread at 82. Tire valve structure 88 is disposed at the accessible end of the hose 70 so that the tire, as desired, may be inflated or deflated.

Referring now to FIG. 1, there is illustrated a wheel motor 90 of conventional design which may be used in conjunction with each rear wheel of large capacity electrical haulage trucks. The rim 10 may be mounted on motor gearing (now shown) in surrounding relation to the motor which is only generally outlined. To this end, the base 12 may slip over the gearing or components thereof and is clamped in place by a number of bolts and nuts. The base is not directly interlocked with the motor. So long as the clamp bolts are adequately tightened, there is no slippage of the rim relative to the mounting structure in the normal usage of the truck. However, in the event that the clamp bolts loosen during service, and the truck is placed under load, the rim may slip circumferentially relative to the drive motor. Normally, the structure within the rim base is oriented with close tolerance between the stationary and moving parts. The result is that circumferential slippage may cause damage to or shearing of the spud to require replacement. The construction of the present invention permits replacement of the spud in many instances while the rim remains on the vehicle. In other instances the wheel and rim will be removed from the vehicle for replacement of the spud. In either case the spud may be replaced without the heretofore required disassembly of the tire from the rim.

The spud of the present invention may by used with any rim construction of the type generally described above. Without intent to limit the description, the spud may be used with rims, such as a 1700 × 49 rim, 2600 × 51 rim, and a 2900 × 57 rim. These rims are suitable for use with a 100, 150, and 200 ton capacity vehicle of the haulage type. The drilled and tapped bore will be located at a distance from the outer edge of the gutter of about 9⅝ inches, 12½ inches, and 18½ inches, respectively, for the respresentative rim sizes above. If a standard rim is to be accommodated for use of the improved spud, the drilled and tapped hole will preferably be removed from the fitting of the prior art to avoid development of undue stress in the rim material.

As may now be appreciated, the improved spud permits ease in maintenance, eliminates the previous requirement that the tire be removed from the rim thus obviating the consequent loss of time and damage to the tire which ensues, and, further, the spud is of a simplier construction and of cheaper cost. Regarding the latter, the spud is formed of an elongated through bore member which requires only a single locknut to assist in securement within a tapped opening.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. In combination: a rim assembly for an oversized off-the-road vehicle including a cylindrical base, a pair of annular flanges received around the base adjacent the peripheries, each of the flanges supporting a portion of the outer wall of a tire adjacent an inner bead thereof which is disposed substantially within the region of the junction of the cylindrical base and flange, means for retaining each of the flanges on the cylindrical rim and the tire therebetween so that the tire may be inflated, and a tapped bore formed in the cylindrical base between the flanges; a fitting in the form of a member having an elongated cylindrical shank and a through-bore of substantially constant diameter, the member including abutment means on the shank between the ends, and threaded partially along the length of the shank from the abutment means toward one end and along the length of the shank from the abutment means toward the other end, the latter thread being relatively coarser for threadedly receiving the member into the bore so that the abutment resides juxtaposed to the cylindrical base; and means for communicating a pressurizing fluid to the tire interior for inflating the same including connector means for threaded receipt on the shank from the one end, a conduit mounted by the connector and extending from the connector along the cylindrical base at least to the region of one of the flanges, and a valve in the conduit remote from the connector for opening and closing fluid communication with the tire.

2. The combination of claim 1 including sealing means within the area of the coarser thread for sealing the member in the bore.

* * * * *